United States Patent Office 2,895,998
Patented July 21, 1959

2,895,998

PYROLYSIS OF BENZENE HEXACHLORIDE

John A. Crowder and Everett E. Gilbert, Morris Township, Morris County, N.J., assignors to Allied Chemical Corporation, a corporation of New York No Drawing. Application October 1, 1954
Serial No. 459,860

6 Claims. (Cl. 260—650)

This invention relates to the pyrolysis of benzene hexachloride and more particularly concerns a catalytic process for converting benzene hexachloride into a reaction product having a novel distribution of constituents.

By benzene hexachloride we refer to the complete mixture of benzene hexachloride isomers formed by additive chlorination of benzene, or to any single benzene hexachloride isomer or to any mixture of two or more benzene hexachloride isomers. The gamma isomer has outstanding commercial utility as an insecticide and is desirably separated by known means from the other isomers. Accordingly, the problem of disposal or utilization of the residual or by-product isomers of benzene hexachloride is of considerable economic importance.

The normal procedure for utilization of benzene hexachloride involves thermal treatment in the liquid phase of benzene hexachloride at temperatures in the range of about 250° to 300° C. and, if desired, in the presence of a catalyst such as ferric chloride. The pyrolysis reaction is slow. The product produced by this process typically contains about 73 to 78% 1,2,4-trichlorobenzene, about 21 to 24% 1,2,3-trichlorobenzene, about 0.5 to 0.7%, 1,2-dichlorobenzene, about 0.2 to 0.4%, 1,4-dichlorobenzene, about 1.2 to 1.6% 1,2,3,4-tetrachlorobenzene and about 0.8 to 1.2% 1,2,4,5-tetrachlorobenzene.

Another procedure for the utilization of benzene hexachloride involves heating the benzene hexachloride with a solution of an alkali such as sodium hydroxide. This procedure possesses the disadvantage of converting valuable hydrogen chloride produced during the process into a chloride such as sodium chloride which has comparatively little value. The distribution of constituents in the resulting product is similar to that obtained in the aforementioned thermal treatment of benzene hexachloride.

Further, as described in Crowder application Serial No. 440,270, filed June 29, 1954, now abandoned, benzene hexachloride may be pyrolyzed over activated carbon at a temperature of at least 300° C. to produce a product which generally contains about 74 to 80% 1,2,4-trichlorobenzene, about 2 to 4% 1,2,3-trichlorobenzene, about 8 to 11% 1,3,5-trichlorobenzene, about 0.8 to 2% 1,2-dichlorobenzene, about 1.5 to 4% 1,3-dichlorobenzene, about 1.8 to 3% 1,4-dichlorobenzene and about 0.3 to 3% 1,2,4,5-tetrachlorobenzene.

An object of the present invention is to provide a new and improved catalytic process for converting benzene hexachloride into a reaction product having a novel distribution of constituents.

A further object of the present invention is to provide a new and improved catalytic process for converting benzene hexachloride into a reaction product containing substantially increased amounts of 1,2-dichlorobenzene, 1,4-dichlorobenzene and 1,2,4,5-tetrachlorobenzene.

Other objects will appear from the following description and examples.

In accordance with the present invention, benzene hexachloride is contacted at a temperature of at least 300° C., preferably at a temperature of about 400° to 500° C., with a catalytic quantity of activated carbon having added thereto a metal chloride. A rapid reaction takes place in which hydrogen chloride gas is liberated as by-product. The hydrogen chloride gas is recovered by suitable means, as by absorption in water. The product gases are cooled to remove liquid and solid product. In preferred operation the product generally contains about 62.6 to 64.0% 1,2,4-trichlorobenzene, about 9.3 to 11.7% 1,2,3-trichlorobenzene, about trace to 5.3% 1,3,5-trichlorobenzene, about 5.6 to 9.3% 1,2-dichlorobenzene, about 4.9 to 6.2% 1,4-dichlorobenzene, and about 9.1 to 12.0% 1,2,4,5-tetrachlorobenzene. Individual desired constituents of the crude liquid product may be separated by comparatively simple procedure. For example, after a topping operation to remove the dichlorobenzene fraction, the residual mixture can be fractionally distilled to remove the trichlorobenzene fraction. The residue is substantially pure 1,2,4,5-tetrachlorobenzene. Each of the di- and tri-fractions may then be separately distilled to recover the desired constituent or constituents contained therein.

By means of the process of this invention, there is produced appreciably larger quantities of 1,2-dichlorobenzene and 1,4-dichlorobenzene than obtained by known pyrolytic processes. 1,2-dichlorobenzene is useful as an insert repellent. 1,4-dichlorobenzene finds utility as a moth repellent.

The present process also yields a considerably larger quantity of 1,2,4,5-tetrachlorobenzene than produced by known pyrolytic procedures. This compound which is produced in substantially pure form may be used directly as a raw material in the manufacture of 2,4,5-trichlorophenoxy-acetic acid herbicide.

In addition to the above observations with respect to product distribution, we have found that use of the activated carbon-metal chloride catalyst in the present process enables rapid pyrolysis reaction.

In achieving the desirable results of the present invention, it is important to employ temperatures of at least 300° C. Particularly high yields of 1,2-dichlorobenzene, 1,4-dichlorobenzene and 1,2,4,5-tetrachlorobenzene have been obtained by using temperatures ranging from about 400° to 500° C. Although higher temperatures may be utilized in practice of our invention, temperatures in excess of about 525° C. should not be employed since such temperatures tend to result in excessive loss of benzene hexachloride starting material to undesired products.

Examples of metal chlorides which may be employed in practice of the present invention are cupric chloride, ferric chloride, zinc chloride, aluminum chloride, cadmium chloride, cobalt chloride and nickel chloride. Particularly efficient catalysts comprise activated carbon containing about 5 to 10% by weight of the metal chloride. The catalyst is suitably prepared by subliming the metal chloride onto the activated carbon or depositing the metal chloride onto the activated carbon from a solution in a suitable solvent.

The process of this invention may be carried out in either batch or continuous manner. In continuous operation, residence times of benzene hexachloride reactant are in the order of about 1 to 10 seconds. However, longer residence times, e.g. up to 120 minutes, as may occur in batch operation, may be used. The longer residence times have no detrimental effect on the course of the reaction; however, they tend to reduce the productive capacity of the catalytic unit.

The activated carbon-metal chloride catalyst of the present invention may be used for extended periods of time without revivification, as in the order of 20 days to 10 weeks or more.

The following examples, in which parts are by weight, illustrate results obtained in practice of the present invention.

*Example 1.*—A glass reaction vessel was charged with 20 parts of an activated carbon-ferric chloride catalyst. On top of the catalyst was placed a layer of glass beads to serve as a vaporizer section.

The activated carbon-ferric chloride catalyst was prepared by wetting 50 parts of Columbia Active Carbon Grade 6G (a commercial form of activated carbon) with dry ether. This mixture was treated with a solution of 5 parts of ferric chloride in 36 parts of dry ether. The ether was then evaporated.

The catalyst was heated to a temperature of about 500° C., and 60 parts of by-product benzene hexachloride isomers remaining after the separation of the gamma isomer were introduced in small increments onto the glass beads over a period of 2.1 hours. The by-product benzene hexachloride isomers vaporized upon contact with the glass beads and passed into contact with the catalyst. Rapid reaction occurred. 27 parts of hydrogen chloride gas which evolved during the reaction were recovered in a water scrubber. Upon condensation of the product gases, 30.5 parts of a liquid product containing a considerable amount of solid 1,2,4,5-tetrachlorobenzene were formed. Upon analysis, the product was found to contain the following constituents:

| Compound: | Percent of product |
|---|---|
| 1,2,4-trichlorobenzene | 63.6 |
| 1,2,3-trichlorobenzene | 11.0 |
| 1,2-dichlorobenzene | 7.9 |
| 1,4-dichlorobenzene | 5.5 |
| 1,2,4,5-tetrachlorobenzene | 12.0 |

*Example 2.*—The same apparatus used in Example 1 was employed in this example. The catalyst which comprised activated carbon coated with zinc chloride was prepared by treating 50 parts of Columbia Active Carbon Grade 6G with a solution of 5 parts of zinc chloride in about 100 parts of water. The water was then evaporated. 20 parts of the catalyst were charged to the reaction vessel, and a layer of glass beads was placed on top of the catalyst.

60 parts of benzene hexachloride by-product isomers were gradually introduced onto the glass beads over a period of about 2 hours, and the resulting vapors passed into contact with the catalyst which had been heated to a temperature of 400° C. Reaction was rapid. 22 parts of hydrogen chloride evolved during reaction were recovered in a water scrubber. The product gases were condensed to produce 36.8 parts of a mixture of a liquid and a solid crystalline substance. Upon analysis, the product was found to contain the following constituents:

| Compound: | Percent of product |
|---|---|
| 1,2,4-trichlorobenzene | 63.6 |
| 1,2,3-trichlorobenzene | 11.7 |
| 1,3,5-trichlorobenzene | trace |
| 1,2-dichlorobenzene | 9.3 |
| 1,4-dichlorobenzene | 4.9 |
| 1,2,4,5-tetrachlorobenzene | 10.5 |

*Example 3.*—The same apparatus used in Example 1 was employed in this example. The catalyst comprised activated carbon containing 10% by weight of aluminum chloride. The catalyst was prepared by dissolving 5 parts of anhydrous aluminum chloride in 18 parts of ether and pouring this solution into 50 parts of activated carbon which had been previously moistened with ether. The ether was then evaporated. The reaction vessel was charged with 20 parts of this catalyst, and a layer of glass beads was placed upon the catalyst.

In one run (A), carried out at 300° C., 60 parts of benzene hexachloride by-product isomers were gradually introduced onto the glass beads over a period of 2 hours, and the resulting vapors passed into contact with the catalyst. Reaction was rapid. Hydrogen chloride evolved during the reaction was recovered in a water scrubber. The product gases were condensed to form a product constituting 27.8 parts. A second run (B) was carried out at 400° C. In this run 60 parts of benzene hexachloride by-product isomers were also introduced onto the glass beads over a period of 2 hours, and the resulting vapors passed into contact with the catalyst. The product gases, upon condensation, formed a product constituting 38.1 parts. The analysis of the two products is as follows:

| Compound | Run A, Percent of product | Run B, percent of product |
|---|---|---|
| 1,2,4-trichlorobenzene | 72.5 | 64.0 |
| 1,2,3-trichlorobenzene | 6.2 | 9.3 |
| 1,3,5-trichlorobenzene | 7.3 | 3.0 |
| 1,2-dichlorobenzene | 3.5 | 6.0 |
| 1,4-dichlorobenzene | 7.0 | 6.2 |
| 1,2,4,5-tetrachlorobenzene | 3.5 | 11.5 |

*Example 4.*—The same apparatus used in Example 1 was employed in this example. The catalyst comprised activated carbon catalyst containing 5% by weight of cupric chloride. This catalyst was prepared by dissolving 5 parts of cupric chloride in about 50 parts of water and then adding the solution to 100 parts of Columbia Active Carbon Grade 6G which was previously moistened with water. The water was then evaporated. The reaction vessel was charged with 14 parts of the catalyst, and a layer of glass beads was placed upon the catalyst.

Runs A and B were carried out at 400° C. and 500° C., respectively. In each run 60 parts of benzene hexachloride by-product isomers were gradually introduced onto the glass beads over a period of 2 hours. The resulting vapors of benzene hexachloride isomers passed into contact with the catalyst, and rapid reaction occurred. In run A 22 parts of hydrogen chloride gas which evolved during the reaction were recovered in a water scrubber. The condensed product constituted 31.5 parts. In run B 26 parts of hydrogen chloride gas were recovered, and the condensed product constituted 37.3 parts. The products were found by analysis to contain the following constituents:

| Compound | Run A, percent of product | Run B, percent of product |
|---|---|---|
| 1,2,4-trichlorobenzene | 61.1 | 62.6 |
| 1,2,3-trichlorobenzene | 9.4 | 11.6 |
| 1,3,5-trichlorobenzene | 4.3 | 5.3 |
| 1,2-dichlorobenzene | 6.8 | 5.6 |
| 1,4-dichlorobenzene | 11.8 | 5.8 |
| 1,2,4,5-tetrachlorobenzene | 6.6 | 9.1 |

Activated alumina and silica gel possess some catalytic activity for the pyrolysis of benzene hexachloride at temperatures in the order of 400° to 575° C. They tend, however, to yield normal products. When such catalysts were treated with a metal chloride such as ferric chloride, the resulting catalyst showed substantially little change in action from the untreated materials.

Although certain preferred embodiments of the invention have been disclosed for purposes of illustration, it will be evident that various changes and modifications may be made therein without departing from the scope and spirit of the invention.

We claim:

1. A process for the pyrolysis of benzene hexachloride which comprises contacting benzene hexachloride with a catalyst comprising activated carbon containing about 5 to 10% by weight of a metal chloride selected from the group consisting of cupric chloride, ferric chloride, zinc chloride and aluminum chloride at a temperature of about 400° to 500° C.

2. A process for the pyrolysis of by-product benzene hexachloride isomers remaining after separation of the gamma isomer which comprises contacting said by-product isomers with a catalyst comprising activated carbon containing about 5 to 10% by weight of a metal chloride selected from the group consisting of cupric chloride, ferric chloride, zinc chloride and aluminum chloride at a temperature of about 400° to 500° C.

3. A process for the pyrolysis of by-product benzene hexachloride isomers remaining after separation of the gamma isomer which comprises contacting said by-product isomers with a catalyst comprising activated carbon containing about 5 to 10% by weight of cupric chloride at a temperature of about 400° to 500° C.

4. A process for the pyrolysis of by-product benzene hexachloride isomers remaining after separation of the gamma isomer which comprises contacting said by-product isomers with a catalyst comprising activated carbon containing about 5 to 10% by weight of ferric chloride at a temperature of about 400° to 500° C.

5. A process for the pyrolysis of by-product benzene hexachloride isomers remaining after separation of the gamma isomer which comprises contacting said by-product isomers with a catalyst comprising activated carbon containing about 5 to 10% by weight of zinc chloride at a temperature of about 400° to 500° C.

6. A process for the pyrolysis of by-product benzene hexachloride isomers remaining after separation of the gamma isomer which comprises contacting said by-product isomers with a catalyst comprising activated carbon containing about 5 to 10% by weight of aluminum chloride at a temperature of about 400° to 500° C.

References Cited in the file of this patent

UNITED STATES PATENTS

| | | |
|---|---|---|
| 2,569,441 | Alquist et al. | Oct. 2, 1951 |
| 2,742,508 | Johnson | Apr. 17, 1956 |
| 2,777,882 | Humphreys | Jan. 15, 1957 |

FOREIGN PATENTS

| | | |
|---|---|---|
| 503,063 | Belgium | Nov. 5, 1951 |
| 511,346 | Belgium | May 31, 1952 |
| 1,010,129 | France | Mar. 19, 1952 |
| 1,018,738 | France | Oct. 15, 1952 |